(12) United States Patent
Kass

(10) Patent No.: US 10,552,416 B2
(45) Date of Patent: Feb. 4, 2020

(54) PROCESSING SQL STATEMENT IN ALTERNATING MODES

(71) Applicant: International Business Machines Corporation, Armonk, NY (US)

(72) Inventor: Eric Kass, Mannheim (DE)

(73) Assignee: International Business Machines Corporation, Armonk, NY (US)

(*) Notice: Subject to any disclaimer, the term of this patent is extended or adjusted under 35 U.S.C. 154(b) by 310 days.

(21) Appl. No.: 15/236,364

(22) Filed: Aug. 12, 2016

(65) Prior Publication Data

US 2017/0103106 A1 Apr. 13, 2017

(30) Foreign Application Priority Data

Oct. 7, 2015 (GB) .................................. 1517732.2

(51) Int. Cl.
*G06F 16/2455* (2019.01)
*G06F 16/242* (2019.01)

(52) U.S. Cl.
CPC ...... *G06F 16/2455* (2019.01); *G06F 16/2423* (2019.01); *G06F 16/2433* (2019.01)

(58) Field of Classification Search
CPC ......... G06F 17/30477; G06F 17/30392; G06F 17/30404; G06F 16/2455; G06F 16/2433; G06F 16/2423
See application file for complete search history.

(56) References Cited

U.S. PATENT DOCUMENTS

| | | | | |
|---|---|---|---|---|
| 5,749,079 A | * | 5/1998 | Yong | G06F 17/30389 |
| 6,496,833 B1 | * | 12/2002 | Goldberg | G06F 16/2423 |
| 7,565,351 B1 | * | 7/2009 | Callaghan | G05B 19/0426 |
| 7,664,795 B2 | | 2/2010 | Balin et al. | |
| 2001/0023420 A1 | * | 9/2001 | Dong | G06F 17/30501 |
| 2003/0065662 A1 | * | 4/2003 | Cosic | G06F 16/252 |
| 2004/0064449 A1 | * | 4/2004 | Ripley | G06F 19/00 |
| 2010/0185645 A1 | | 7/2010 | Pazdziora | |
| 2012/0084315 A1 | * | 4/2012 | Schneider | G06F 17/30442 707/769 |
| 2013/0282758 A1 | * | 10/2013 | Seitz | G06F 9/5016 707/770 |
| 2014/0122452 A1 | * | 5/2014 | Faerber | G06F 17/30315 707/693 |
| 2014/0244680 A1 | | 8/2014 | Chandran et al. | |

* cited by examiner

*Primary Examiner* — Alford W Kindred
*Assistant Examiner* — Lin Lin M Htay
(74) *Attorney, Agent, or Firm* — Stephen R. Yoder; David B. Woycechowsky

(57) ABSTRACT

A Processing method for processing SQL statements of different flavors by a database management system may be provided. The method comprises receiving SQL statements of different SQL flavors, parsing each received SQL statement for identifying an SQL flavor characteristic, tracking an SQL statement identifier of a related SQL PREPARE operation for determining the SQL flavor characteristic at subsequent DMBS operations, adapting a DBMS mode of the DBMS dynamically to the identified SQL flavor characteristic, adapting another received SQL statement to a DBMS mode of the database management system, and sending each of the adapted SQL statements to the DBMS for the SQL PREPARE operation under the adapted database management system mode.

15 Claims, 11 Drawing Sheets

100

| 102 | receiving, SQL statements of different structured query language (SQL) flavors |

| 104 | parsing each received SQL statement for identifying an SQL flavor |

| 106 | Tracking an SQL statement identifier of a related SQL PREPARE operation |

| 108 | adapting a relational database management system mode of the relational database management system dynamically to the identified SQL flavor characteristic |

| 110 | adapting another received SQL statement to a relational database management system mode |

| 112 | sending each of the adapted SQL statements to the relational database management system for the SQL PREPARE operation |

FIG. 1

```
SE -> .SELECT FE SClauseList
SClauseList -> .SClause
SClauseList -> .SClause SClauseList
SClause -> .FROM TE
TE -> .TableList
TableList -> .TableEntryJoin
TableList -> .TableList comma TableEntryJoin
TableEntryAlias -> .TableEntry
TableEntryAlias -> .TableEntry AS TableAlias
TableEntryAlias -> .TableEntry TableAlias
TableEntry -> .TableSchemaName
TableEntry -> .paren0 JoinFullQuery paren1
TableEntry -> .TableSchemaName ColumnSpec
TableEntry -> .paren0 JoinFullQuery paren1 ColumnSpec
TableAlias -> .TokenText
TableSchemaName -> .TableName
TableSchemaName -> .Schema period TableName
TableSchemaName -> .Schema slash TableName
TableName -> .TokenText
TableEntryJoin -> .TableEntryAlias
TableEntryJoin -> .TableEntryJoin JoinSpec TableEntryAlias ON WE
TableEntryJoin -> .TableEntryJoin JoinSpec TableEntryAlias USING ColumnSpec
TableEntryJoin -> .TableEntryJoin JoinSpec TableEntryAlias to be continued in Fig. 7b
```

FIG. 7a

```
JoinSpec -> .JOIN
JoinFullQuery -> .JoinSubQuery
JoinSubQuery -> .SE
ColumnSpec -> .paren0 ColumnList paren1
ColumnList -> .ColumnName
ColumnList -> .ColumnList comma ColumnName
ColumnName -> .FieldName
FieldName -> .asterisk
FieldName -> .TokenText
FieldName -> .TableQualifier period FieldName
TableQualifier -> .TokenText
FE -> .ExpressionList
ExpressionList -> .ExpressionAS
ExpressionList -> .ExpressionList comma ExpressionAS
ExpressionAS -> .Expression
Expression -> .ExpValueSign
ExpValueSign -> .ExpValue
ExpValueSign -> .sign ExpValue
ExpValue -> .Function paren0 paren1
ExpValue -> .Function paren0 SE paren1
ExpValue -> .FieldName
ExpValue -> .marker
Function -> .TokenText
Function -> .RRN
```

FIG. 7b

```
SELECT MyField FROM MySchema/MyTable WHERE RRN(MyTable) > 10
  G.SQLGoal.SQLExpression.FullQuery.SubQuery.SE
    [SELECT]

FE.ExpressionList.ExpressionAS.Expression.ExpValueSign.ExpValue.FieldName
      [MyField]
        SClauseList
          SClause
            [FROM]

TE.TableList.TableEntryJoin.TableEntryAlias.TableEntry.TableSchemaName
        Schema
          [MySchema]
          [/]
        TableName
          [MyTable]
      SClauseList.SClause
        [WHERE]
        WE.PredicateList.Predicate
          Expression.ExpValueSign.ExpValue
            Function
              [RRN]
ExpFullQuery.ExpSubQuery.ExpressionList.ExpressionAS.Expression.ExpValueSig
n.ExpValue.FieldName
                      [MyTable]
                        []]
                    cmp
                      [>]
                    Expression.ExpValueSign.ExpValue
                      [10]
```

FIG. 8

PROCESSING SQL STATEMENT IN ALTERNATING MODES

BACKGROUND

Aspects of the disclosure relate generally to a processing of SQL statements, and more specifically, to a method for processing structured query language (SQL) statements of different flavors by a database management system. Aspects of the disclosure relate further to a related database system and a computer program product. Software applications that grow over time in functionality also grow in complexity. The code base of an application, i.e., the set of program code compiled to an executable industry application often includes segments originating from the earliest version of the software product as well as segments of very recent software development frameworks.

SUMMARY

Aspects of the disclosure include processing structured query language (SQL) statements of different flavors by a database management system may be provided. Aspects can include receiving SQL statements of different structured query language (SQL) flavors from one source, parsing each received SQL statement for identifying an SQL flavor characteristic of the received SQL statements, and tracking an SQL statement identifier of a related SQL PREPARE operation of the received SQL statements for determining the SQL flavor characteristic at subsequent database management system operations referencing the SQL statement identifier.

Embodiments can include adapting a database management system mode of the database management system dynamically to the identified SQL flavor characteristic, adapting another received SQL statement to a database management system mode of the database management system, and sending each of the adapted SQL statements to the database management system for the SQL PREPARE operation under the adapted database management system mode.

In embodiments, a database management system (DBMS) for processing structured query language (SQL) statements of different flavors may be provided. The DBMS may include a receiving unit adapted for receiving SQL statements of different structured query language flavors from one source, a parser module adapted for parsing each received SQL statement for identifying an SQL flavor characteristic of the received SQL statements, and a tracking unit adapted for tracking an SQL statement identifier of a related SQL PREPARE operation of the received SQL statements for determining the SQL flavor characteristic at subsequent database management system operations referencing the SQL statement identifier.

The DBMS may include a first modifying unit adapted for adapting a database management system mode of the database management system dynamically to the identified SQL flavor characteristic, a second modifying unit adapted adapting another received SQL statement to a database management system mode of the database management system, and a sending unit adapted for sending each of the adapted SQL statements to the database management system for the SQL PREPARE operation under the adapted database management system mode. The database management system may be a relational database management system.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

It should be noted that embodiments of the disclosure are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present disclosure are apparent from the examples of embodiments to be described hereinafter and are explained with reference to the examples of embodiments, but to which the disclosure is not limited.

Embodiments of the disclosure will be described, by way of example only, and with reference to the following drawings:

FIG. 1 shows a block diagram of an embodiment of the inventive method for processing structured query language (SQL) statements of different flavors by a database management system.

Figure 2:
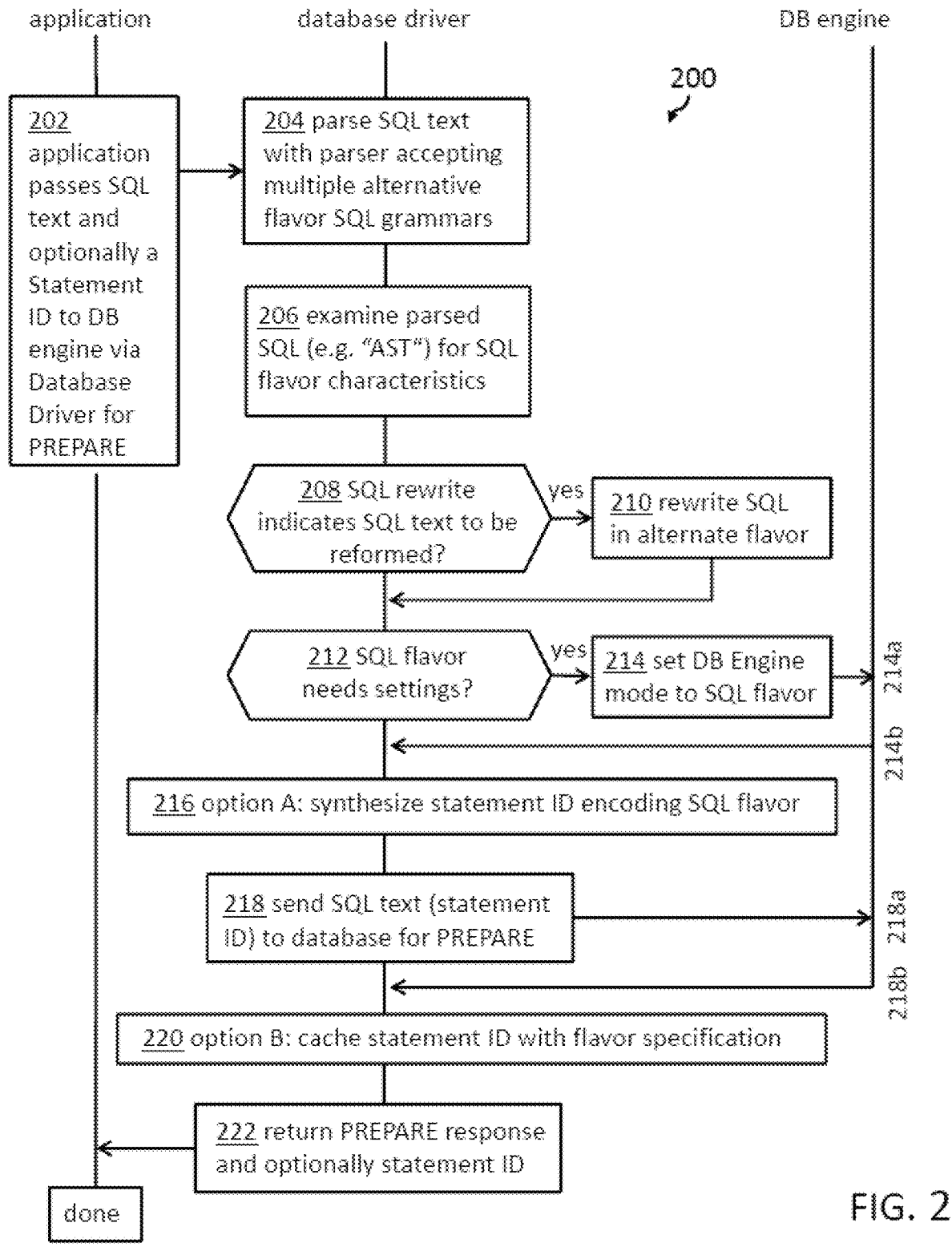

FIG. 2 shows a block diagram of an SQL flavor PREPARE statement processing.

Figure 3:
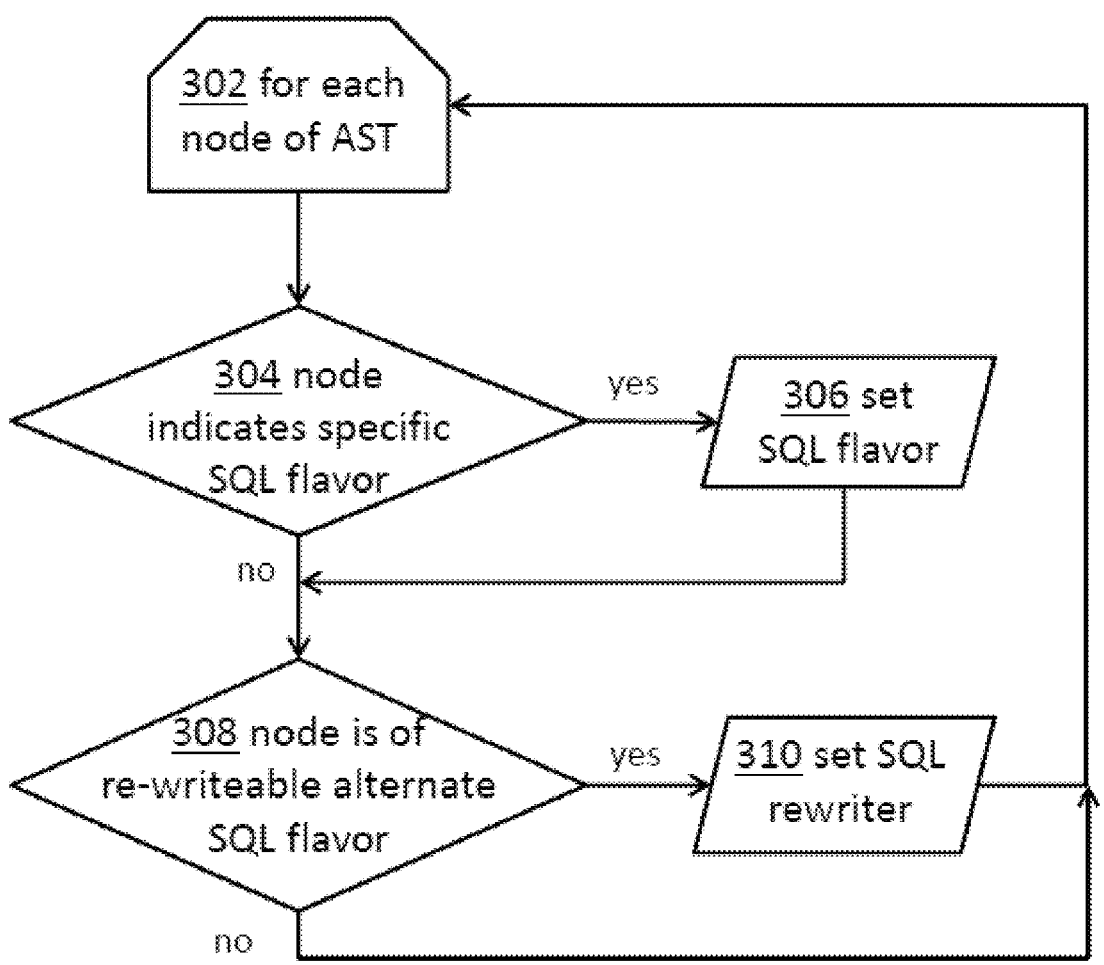

FIG. 3 shows an expanded block diagram of block 206 of FIG. 2.

Figure 4:
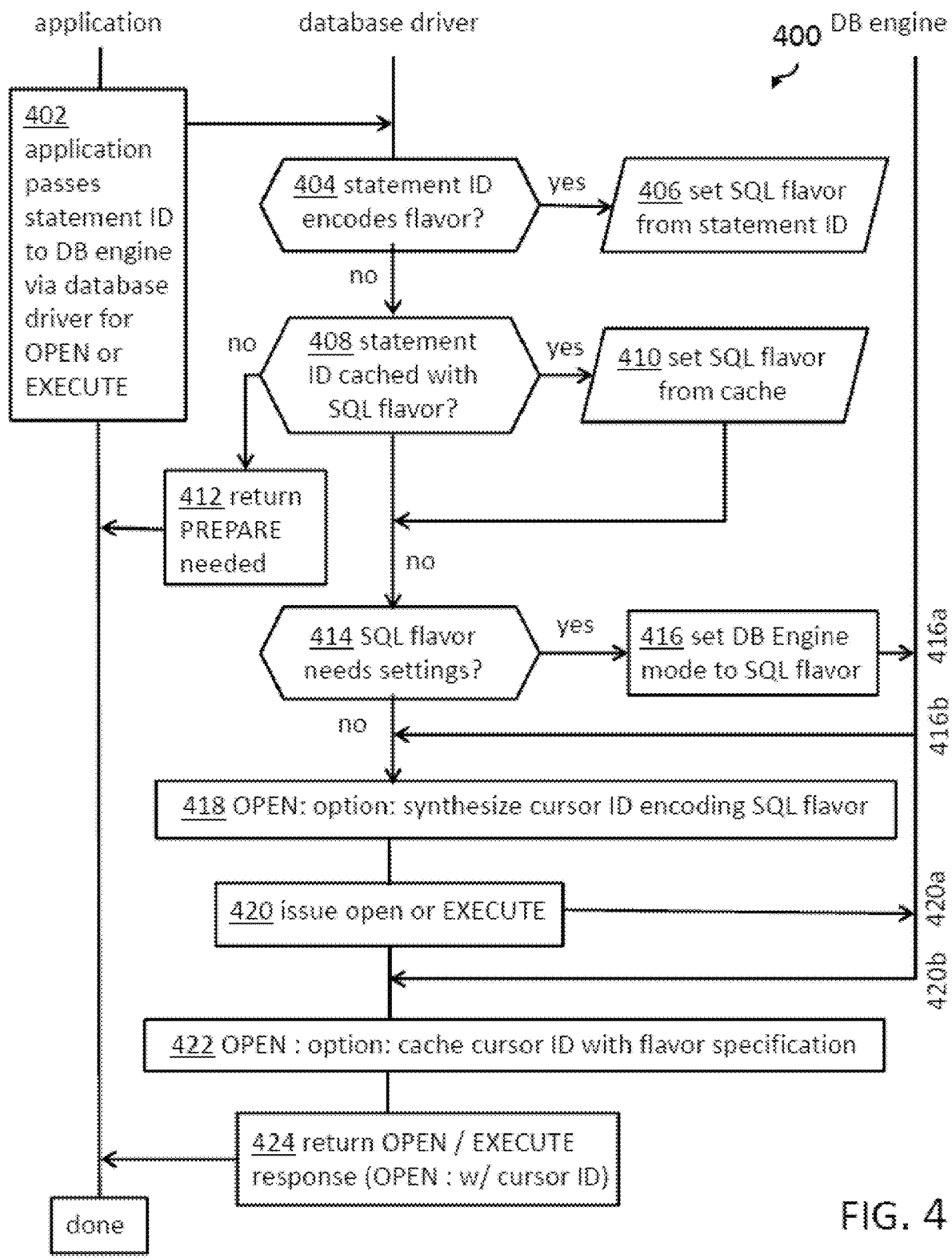

FIG. 4 shows a block diagram of an SQL flavor OPEN/EXECUTE statement processing.

Figure 5:
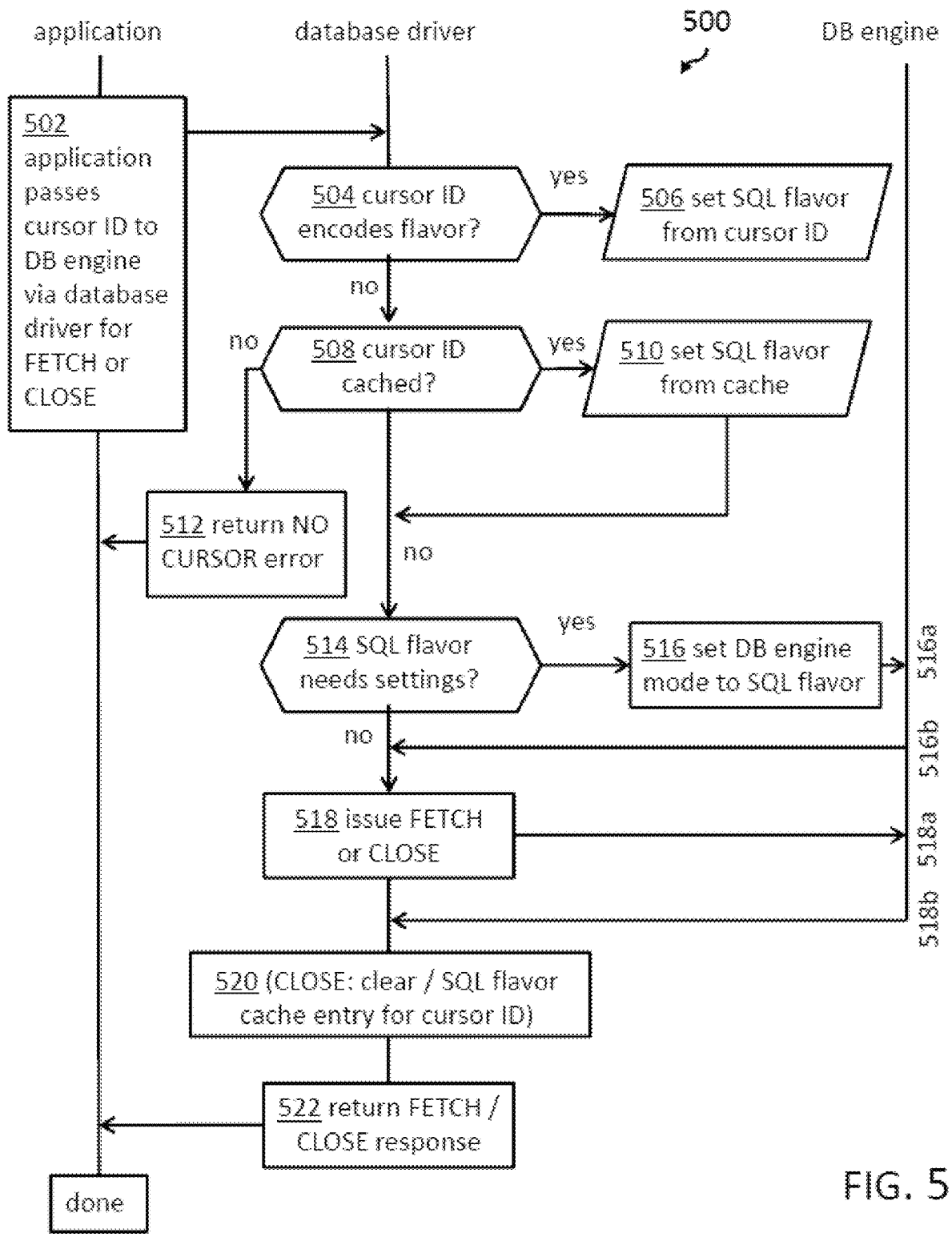

FIG. 5 shows a block diagram of an SQL flavor FETCH/CLOSE statement processing.

Figure 6:
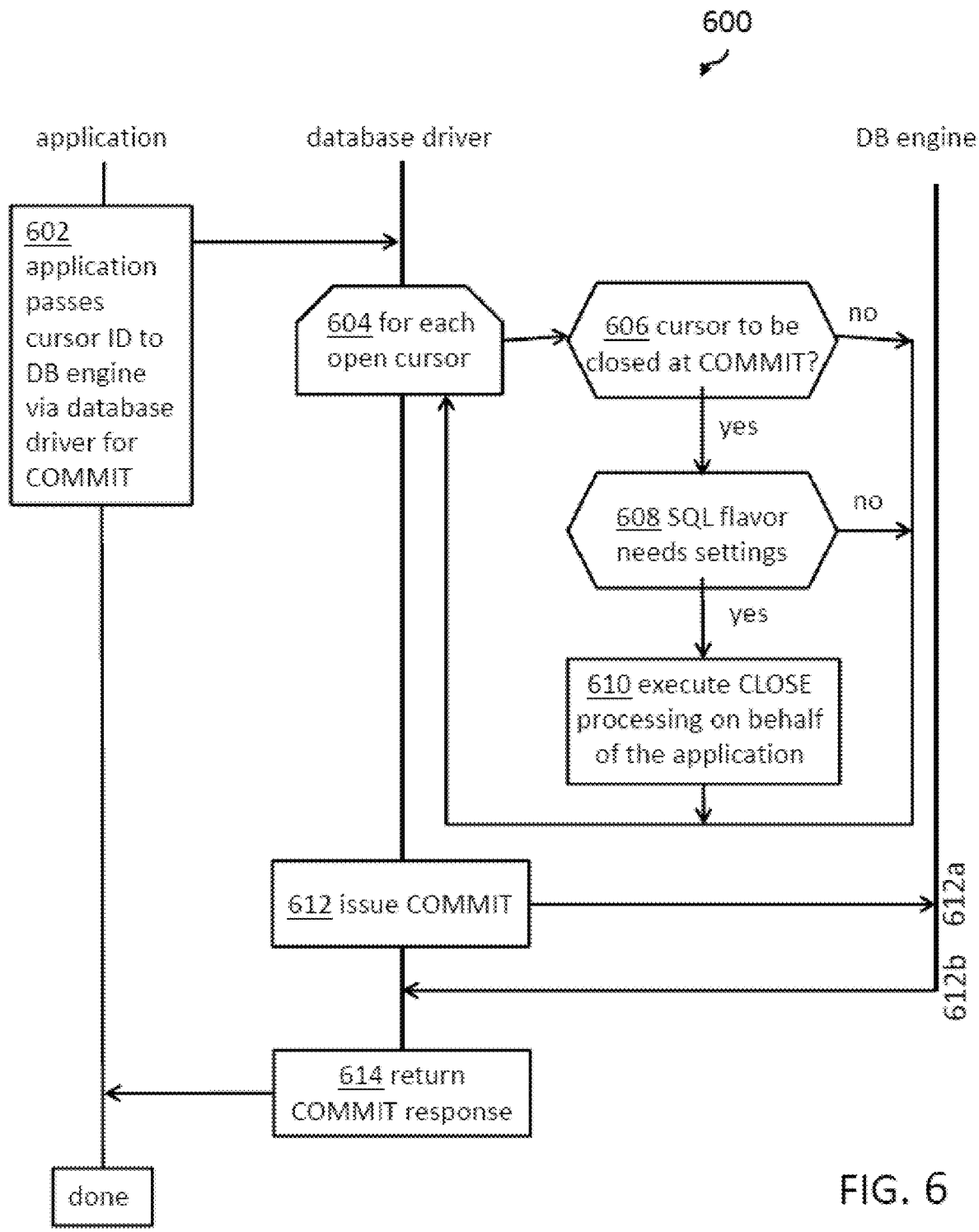

FIG. 6 shows a block diagram of an SQL flavor COMMIT statement processing.

FIGS. 7a, 7b show together an example of the abbreviated grammar of an IBM System i SQL naming mode embodiment.

FIG. 8 shows an example of a parse tree, which may easily be interpreted by a person skilled in the art of database management systems.

Figure 9:
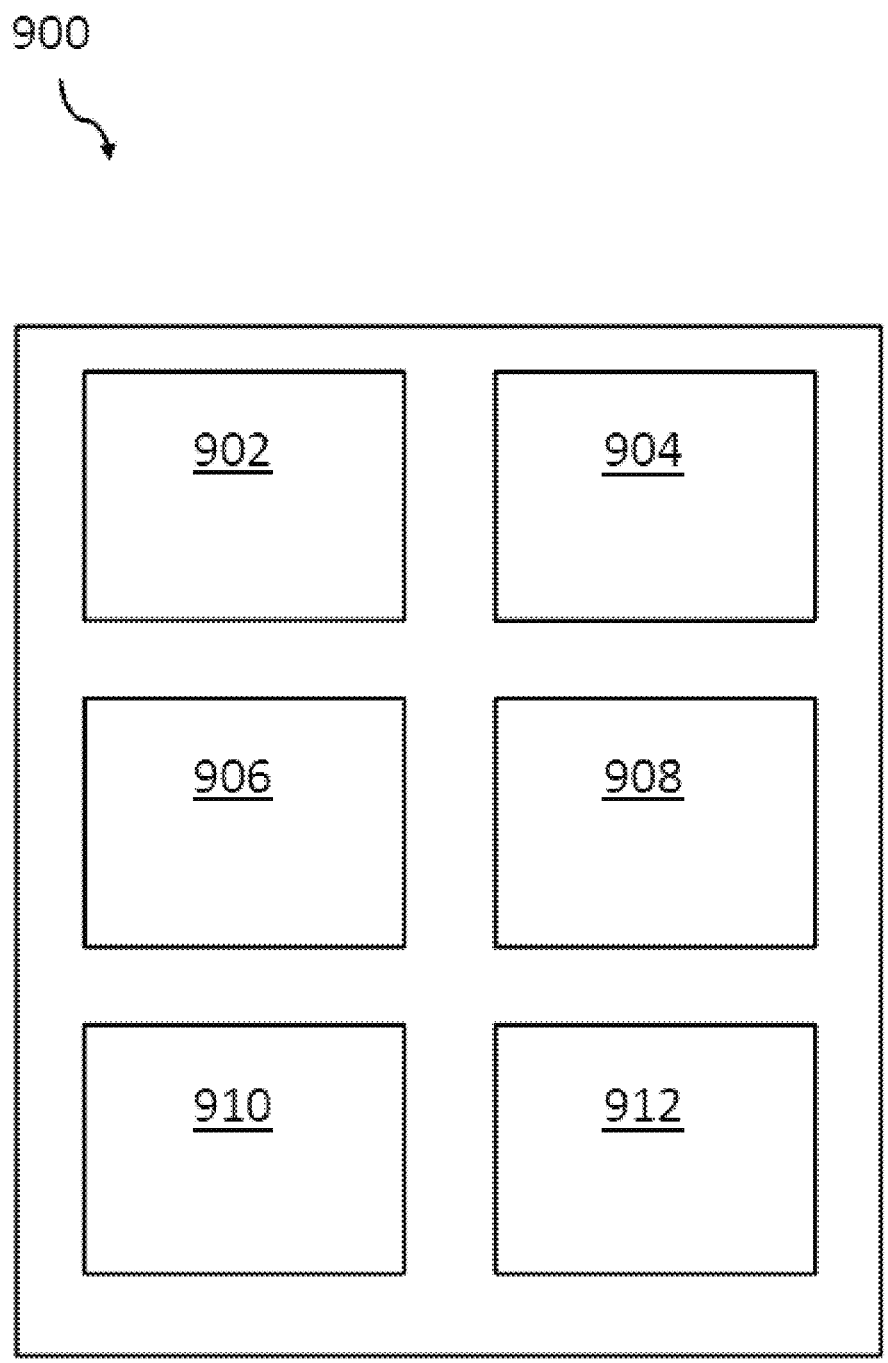

FIG. 9 shows a block diagram of a database management system for processing structured query language (SQL) statements of different flavors.

Figure 10:
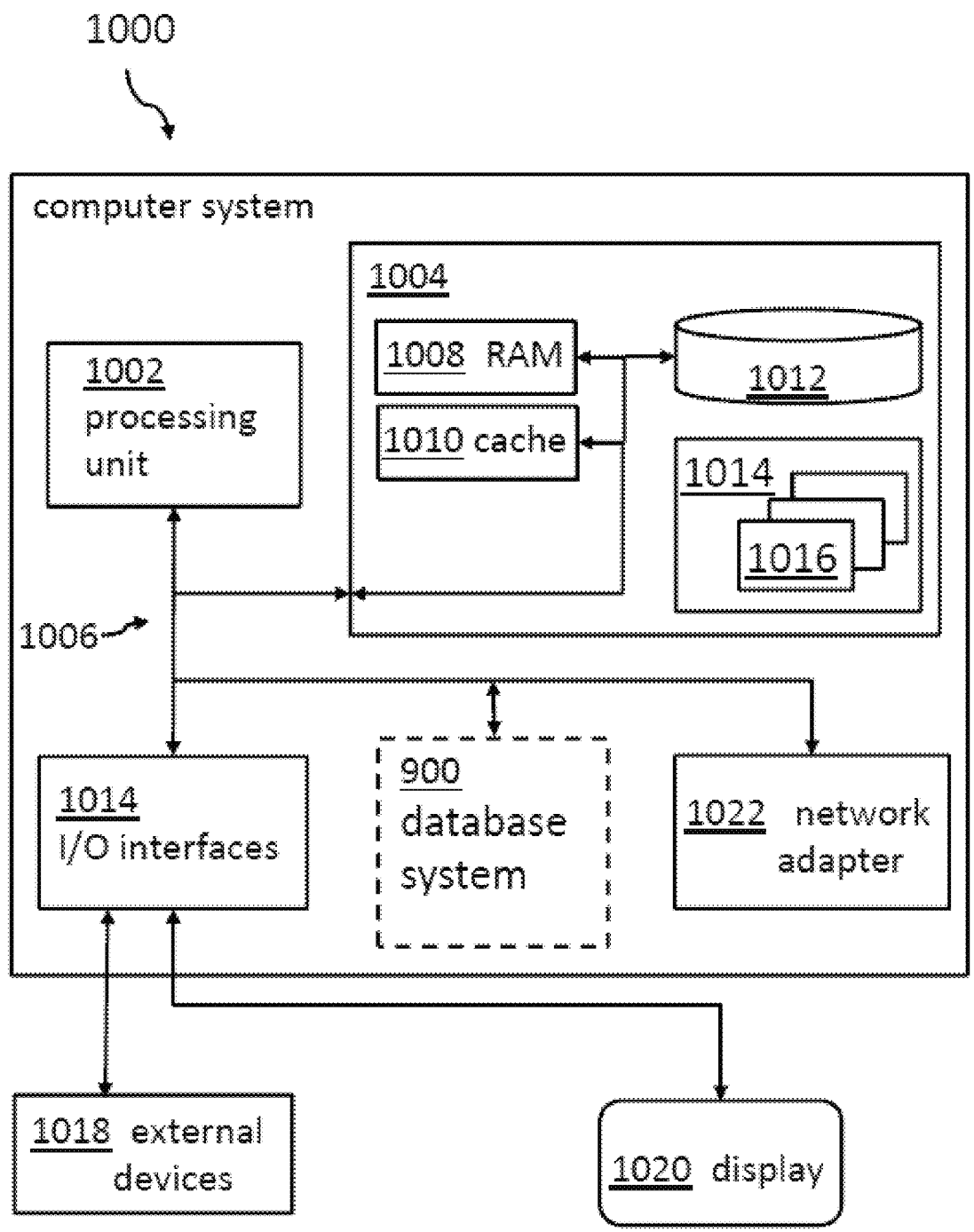

FIG. 10 shows a block diagram of a computing system comprising the database management system according to FIG. 9.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Industry applications access relational database management systems, relational database systems, database management system (DBMS), or, simply database systems by way of the Structured Query Language (SQL). However, even databases being compliant with SQL may still require different handling and access by a calling application. Thus, accessing a specific database system may require modifications to the code base when accessing an SQL database with a different syntactic and semantic characteristic than the code it was originally designed for. It may be noted that this document further refers to the syntactic and semantic language specification of an SQL database as an SQL language flavor.

To support a migration of existing applications and to provide for compatibility across a broad range of applications, some SQL database vendors provide emulation modes that allow unmodified SQL code written for a database of a particular vendor to interoperate with a database from a different vendor using a different SQL flavor. However, such a flavor switch may not be sufficient to address problems relating from code base with a long history and using different SQL database access flavors within one code base of one application. Today, it is challenging (e.g., not possible) to run an SQL-based application without modifying the code of a long historical code base containing SQL code designed for various or different SQL language flavors.

In the context of this description, the following conventions, terms and/or expressions may be used:

The term 'database management system'—in particular relational database management system—may denote a digital database whose organization is based on the relational model of data, as proposed by E. F. Codd in 1970. This model organizes data into one or more tables (or "relations") of rows and columns, with a unique key for each row. Generally, each entity type, described in a database, has its own table: the rows representing instances of that type of entity, and the columns representing values attributed to that instance.

The term 'structured query language (SQL)' may denote the well-known special-purpose programming language designed for managing data held in a relational database management system (RDBMS), or for stream processing in a relational data stream management system. Originally based upon relational algebra and tuple relational calculus, SQL consists of a data definition language, data manipulation language, and a data control language. The scope of SQL may include data insert, query, update and delete, schema creation and modification, and data access control.

The term 'SQL flavors' may denote a dialect of SQL (structured query language). Different vendors have adapted, modified or extended standard SQL. The basic SQL statements may be used unchanged; however, some more peripheral statements or vendor specific statements may be implemented in a not-standard way. Examples of SQL flavors may be a DB2 flavor, a Sybase flavor, a MySQL flavor, an Informix flavor, a Microsoft flavor or an Oracle flavor.

The term 'database mode' may denote that a database, in particular a relational DBMS operating with SQL statements, may not only be able to interpret standard SQL or SQL statements of one specific SQL flavor, i.e., from a specific vendor which enhanced the standard SQL of the DBMS with additional language constructs, but also another SQL flavor, e.g., of another DBMS vendor The term 'SQL flavor characteristic' may denote a language element in an SQL statement that reveals the special SQL flavor. Example may be the following: The IBM System i database—for the System i—has two modes of operation. Firstly, a "system naming" mode, whereby the schema name is followed by a "/", and secondly an "SQL naming" mode, whereby the schema name is followed by a ".". These two SQL flavor characteristics or characteristic elements of an SQL flavor may be used to determine the specific SQL flavor of an issued SQL statement. It may be known that the system naming mode and the SQL naming mode of the System i have other specific behavioral characteristics beyond this syntax element.

The term 'statement identifier' may denote a unique identifier of an SQL statement that a DBMS may return to a database driver or an application, e.g., from a PREPARE statement. Using this statement identifier reference may be made later to this identifier. This is important in an environment in which the DBMS mode may be changed dynamically from one SQL statement to another SQL statement. If, e.g., the application program issued an OPEN statement according to a specific mode of the DBMS, then a subsequent READ or FETCH statement should better also use the SQL statement flavor for these subsequent statements in the same flavor as the OPEN statement was issued. This remains true even if the DBMS mode may have been switched to another DBMS flavor between the OPEN statement and the READ of FETCH statement. Thus, the DBMS mode should be switched back to the first SQL flavor.

The term 'PREPARE operation' may denote a preparation of an SQL statement for a later execution in a DBMS. A 'prepared statement' or 'parameterized statement' may be a feature used to execute the same or similar database statements repeatedly with high efficiency. Typically used with SQL statements such as queries or updates, the prepared statement takes the form of a template into which certain constant values are substituted during each execution. The typical workflow of using a prepared statement is as follows: Prepare: The statement template may be created by the application and sent to the DBMS. Certain values may be left unspecified, called parameters, placeholders or bind variables, e.g., INSERT INTO PRODUCT (name, price) VALUES (?, ?); the '?' may define the parameters. The DBMS may parse, compile, and perform query optimization on the statement template, and may store the result without executing it. Thus, the typical SQL statement sequence would be prepare-open-fetch-close or prepare-open-execute-close-commit.

Execute: At a later time, the application supplies (or binds) values for the parameters, and the DBMS may execute the statement (possibly returning a result). The application may execute the statement as many times as it wants with different values.

As compared to executing SQL statements directly, prepared statements may offer various performance or efficiency benefits. The overhead of compiling and optimizing the statement may be incurred only once, although the statement is executed multiple times. Not all optimization may be performed at the time the prepared statement is compiled, for two reasons: the best plan may depend on the specific values of the parameters, and the best plan may change as tables and indexes change over time. Prepared statements may be resilient against SQL injection, because parameter values, which are transmitted later using a different protocol, need not be correctly escaped. If the original statement template is not derived from external input, SQL injection cannot occur.

The terms 'FETCH', 'COMMIT' and 'OPEN' in this application description may be interpreted as standard SQL statements. However, their handling by the DBMS may be slightly different if compared to standard, single flavor SQL databases, as described in the context of the figures.

The term 'dynamically', in particular, dynamically changing the mode of the relational database management system may denote that the DBMS may change its mode during operation and even during a plurality of access from one source or one application. This may mean that one single application may issue SQL statements of different flavors during the execution of the one application. Thus, the DBMS mode may be changed during the execution of the application. The DBMS engine may, e.g., switch between two—or even more—different DBMS modes depending on the SQL flavor of the received SQL statement.

The proposed Processing SQL Statement in Alternative Mode may offer various performance or efficiency benefits. Industry or enterprise applications which may have been composed of different libraries, code fragments, programming frameworks—in particular, open source frameworks—and environment specific code segments from various sources may comprise SQL statements for accessing a database but according to different SQL flavors. Often, it may be practically not possible to modify all SQL statements in the complete code base of an application to be compatible with one single SQL database type or flavor.

The proposed method for processing structured query language (SQL) statements of different flavors by a (relational) database management system may solve this problem by dynamically adapting and aligning SQL statements of different flavors within one application code base to a database mode or by changing the DBMS mode dynamically to fit to the SQL flavor of the received SQL statement from one source, i.e., one application. Thereby, a mode of a DBMS may relate to a specific DBMS flavor (compare above: the syntactic and semantic language specification of an SQL database).

Hence, program developers may use code segments coming from different sources using different flavored SQL statements and composing new functions into existing applications. Thus, applications having a long history may be enhanced with new code segments for new and additional functionality using a different SQL flavor compared to those code segments which have been developed in the early days of the applications using SQL statements of a different SQL flavor. Consequently, development times for the enhancements may be reduced and the application functionality may be extended without reflecting prior used SQL statement flavors for a DBMS access.

It may also be noted that prior art technology of simply dynamically reforming one flavor of SQL statement into another flavor of SQL statement does not also have the effect of switching the implicit semantic behavior of the RDMS to one expected by the original SQL statement. However, DBMS semantic switching—in particular for relations databases—is exactly possible by the proposed method. This feature is detailed in an embodiment, System Naming implies different semantics than SQL naming when the RDMS needs to search schemas to locate an unqualified table (i.e., NOT My.Schema.MyTable) referenced to by name in and SQL statement (see example below: system naming mode vs. SQL naming mode).

An embodiment of the method may comprise issuing an OPEN CURSOR and/or an EXECUTE statement according to the (relational) database management system mode. Thus, known and required statements of a DBMS may be executed as in any other DBMS.

An embodiment of the method may also comprise tracking an SQL cursor identifier of the SQL OPEN CURSOR operation for determining the SQL flavor characteristic at subsequent (relational) database management system operations referencing the SQL cursor identifier. The cursor identifier may be generated by the DBMS and may be used as part of the method in a database driver of an application. Hence, already available identifiers may be used for the inventive method.

According to an embodiment of the method, the method may include controlling the (relational) database management system mode based on the SQL language flavor characteristic associated with the SQL cursor identifier, and issuing a FETCH and/or a CLOSE CURSOR operation according to the DBMS mode. This way, the detected flavor of the DBMS is used to issue statements in a compatible form of one SQL flavor. Otherwise, the DBMS engine would generate an error message because the statements may not be recognized.

According to a further optional embodiment of the method, the method may also comprise intercepting a database COMMIT operation of the CURSOR. At a COMMIT statement, all open cursors relating to the COMMIT operation may need to be closed iteratively. On the other side, some special "HOLD" cursors marked "keep open" may remain open over a COMMIT operation.

According to an embodiment of the method, the adapting the received SQL statement to the relational database management system mode may comprise modifying the received SQL statement from a compatibility to a first relational database management system mode to a compatibility to a second relational database management system mode. This modifying may be required if the application may have issued an SQL statement not compatible with the current SQL mode of the DBMS. It may be understood that the modifying may basically be a rewriting of the SQL statement, which may not be required if the SQL flavor and the DBMS mode are already compatible to each other.

According to one permissive embodiment of the method, the adapting a relational database management system mode may comprise changing the relational database management system mode corresponding to the identified SQL flavor characteristic of the received SQL statement. This technique may be used alternatively to the 'modifying the received SQL statement', as described in the previous paragraph. In some cases it may be better to change the SQL statement and in other cases—i.e., for another SQL statement—it may be better to change the DBMS mode. The proposed method allows both options.

As an example for changing the DBMS mode, two modes of the IBM System i database may be used: the system naming mode and the SQL naming mode.

According to the inventive method, each received SQL statement may be parsed using an LR-parser (left-right) with an extended grammar. SQL statements using the system naming mode may have:
- the syntactic property that schema names are followed by a "/";
- the semantic property that unqualified tables reside along a path (LIBRARAY list);
- schema qualified table names can be referenced in SQL statements by table name only, or by an alias.

Thus, the following statements in the system naming mode, which may be determined as being correct, may include:
SELECT MyTable.Column FROM MySchema/MyTable
SELECT MySchema/MyTable.Column FROM MySchema.MyTable
SELECT MyTable.Column FROM MySchema/MyTable AS MyTable SQL statements using the SQL naming mode may have:
the syntactic property that schema names are followed by a ".";
the schema property that unqualified tables must reside in the current schema;
schema qualified table names may be referenced in SQL statements only by schema qualified table name by an alias.

Thus, the following statements in the SQL naming mode, which may be determined as being correct, may include:
SELECT MySchema.MyTable.Column FROM MySchema.MyTable
SELECT MyTable.Column FROM MySchema.MyTable AS MyTable
In contrast to this, the following statement
SELECT MyTable.Column from MySchema.MyTable what be interpreted as not allowable and thus, wrong, causing an error message.

The method according to the specification may also be more specific. In some cases it might be advantageous to simply dynamically modify the SQL statement with the alternative syntax—i.e., "/" with "."—and issue the statement using the alternative SQL flavor. In some cases, it may be necessary to further analyze characteristics of the SQL statement to make a determination under which SQL language flavor to issue the statement.

The special function RRN (relative record number), e.g., DB2 for IBM system i, may return the relative record number as a resultant row of a query. The RRN function may take the table name as argument. Under the system naming, the following syntax may be valid:
SELECT RRN (MyTable) FROM MySchema/MyTable
SELECT RRN (MySchema/MyTable) FROM MySchema/MyTable
SELECT RRN (MyTable) FROM MySchema/MyTable AS MyTable On the SQL naming mode, the following syntax may be valid:
SELECT RRN (MySchema.MyTable) FROM MySchema.MyTable
SELECT RRN (MyTable) FROM MySchema.MyTable AS MyTable An actual example is in the case of presence of a function, whereby the table referenced in the FROM clause RRN if fully qualified (example as above), the proposed method would be able to do one of the following:
Run the SQL statement under system naming mode (also converting
MySchema/MyTable to MySchema.MyTable if necessary depending on the database version),
Detect that the SQL statement has system naming semantics (based on the presence of MySchema/MyTable) and run the SQL statement on the SQL naming by:
a) After appending MySchema to MyTable within the RRN function:
>SELECT RRN (MySchema.MyTable FROM MySchema.MyTable
b) After appending AS MyTable in the FROM clause:
>SELECT RRN (MyTable) FROM MySchema.MyTable AS MyTable According to an embodiment, the method may be executed by a database driver for the database management system. This way, no modifications may be required for the application issuing the SQL statements. On the other side, the core DBMS engine may also not require a change. The application may issue a mix of SQL statements of different flavors and the intermediate layer of the data driver may handle the novel method as described herein.

According to an embodiment of the method, the parsing may be performed using a left-right parsing method. Thus, available standard parsing methods may be implemented without any additional overhead as part of the proposed method.

According to one useful embodiment of the method, the SQL flavor may relate to a system naming mode or an SQL naming flavor, those intended for the IBM system i. However, the SQL flavor may not be limited to these DBMS modes. Alternative embodiments may be adapted for handling an Oracle mode, a DB2 mode, a MySQL mode or others.

In the following, a detailed description of the figures will be given. All instructions in the figures are schematic. Firstly, a block diagram of an embodiment of the inventive method for processing structured query language (SQL) statements of different flavors by a database management system is given. Afterwards, further embodiments as well as embodiments of the related database system will be described.

FIG. 1 shows a block diagram of an embodiment of the method 100 for processing structured query language (SQL) statements of different flavors by a database management system. The statement may be generated by a software application or may be received by another system and be received by the DBMS. The method comprises receiving, 102, SQL statements of different structured query language (SQL) flavors from one source, parsing, 104—in particular parsing dynamically, i.e., during operation of the database and the reception of the SQL statement—each received SQL statement for identifying an SQL flavor characteristic of the received SQL statements, and tracking, 106, an SQL statement identifier of a related SQL PREPARE operation of the received SQL statements for determining the SQL flavor characteristic at subsequent database management system operations referencing the SQL statement identifier.

It may be noted that the one source may be one single application, which may be composed of different services.

Additionally, the method 100 comprises adapting, 108, a database management system mode of the database management system dynamically to the identified SQL flavor characteristic, adapting, 110, another received SQL statement to a database management system mode of the database management system, and sending, 112, each of the adapted SQL statements to the database management system for the SQL PREPARE operation under the adapted database management system mode. The database management system may be organized according to the rules of a relational database management system.

An application program code sequence—e.g., ODBC (open database connectivity)—to read data from a database management system using SQL are operations of a PREPARE statement, an OPEN-CURSOR statement, a FETCH-DATA—in short, FETCH—statement and a CLOSE-CURSOR statement. In the context of these expressions also the term operation instead of statement may be used. Another exemplary program code sequence to write data to the DBMS using SQL statements are the operations of a PREPARE statement, and an EXECUTE statement. Other database management system operations like COMMIT, and data definition language (DDL) statements may have similar sequences.

The sequence of prepare-open-fetch-close or, prepare-execute may be combined in some programming API (application programming interface) provided by the database driver. The application programmer may therefore not be aware of the complete sequence and the internal operation of the DBMS. The database driver may take over the correct mapping of SQL flavored statements and DBMS modes.

FIG. 2 shows a block diagram 200 of an SQL flavor PREPARE processing. An application may begin a code sequence and optionally a statement identifier (ID) that uniquely identifies the SQL text to the database engine by way of a database driver—compare 202—for preparation (PREPARE). The database driver begins by parsing the SQL text with an SQL parser specially designed to accept multiple flavors of SQL text—block 204. A typical SQL parser designed for only one SQL flavor may abort parsing with a syntax failure otherwise. The parsed SQL text results in an abstract syntax tree (AST). The parsed SQL text is examined for items—i.e., SQL flavor characteristics—that would represent one SQL flavor or another—block 206. It may be noted that the block 206 is expanded, showing more details in FIG. 3.

Then, the SQL text may be modified, i.e., rewritten, 210, if necessary before being sent to the database engine, block 208. After an SQL text pre-processing, it is determined whether the database engine mode needs to be changed in order to handle that particular SQL flavor based on an SQL flavor indicator set in block 206 (details see FIG. 3)—block 212. If so, the mode of the database engine is changed—compare 214, 214a, 214b.

If it may be required to store the statement identifier to SQL flavor association, the proposed method may optionally allow synthesizing a statement identifier, encoding the associated SQL flavor of the statement—block 216.

The database driver performs a standard function of sending the SQL PREPARE request to the database. This may also include the original statement identifier or the application or statement identifier synthesized by the driver, encoding information about the SQL flavor—block 218.

Then, the database performs the PREPARE operation—compare 218a—and returns with a status code and possibly a generated statement identifier, compare 218b. If it may be required to store the statement identifier to SQL flavor association, the proposed method may have the option to cache the statement identifier either from the application or the one returned from the DBMS engine along with the associated SQL flavor of block 220.

Next, the database driver returns the result of the database engine PREPARE result and optionally a statement identifier (originally from the application, one generated by the database engine, or one synthesized by the application)—block 222.

FIG. 3 shows an expanded block diagram of block 206 of FIG. 2. In one embodiment, the abstract syntax tree (AST) representing the SQL text is examined node-by-node, block 302. If the node is of a particular SQL flavor—determination 304—that would require the database engine be changed to operate at the specific flavor, i.e., in the specific mode, an indicator variable, termed SQL flavor, is set to remember this—block 306. If the node is of a type that should be rewritten in an alternative SQL flavor—determination 308—the node may be rewritten immediately, and/or an indicator variable can be set to remember this—block 310.

FIG. 4 shows a block diagram 400 of an SQL flavor OPEN/EXECUTE processing. The application may execute a program code sequence to read from the database by initiating an SQL OPEN operation and passing a statement identifier associated to the SQL text, the application intends to invoke—block 402. The application may now continue with a program code sequence to change data in the database by initiating an SQL EXECUTE passing the statement identifier associated to the SQL text the application intends to invoke.

If the database driver has encoded the SQL flavor within the statement ID, determination 404—an indicator variable, i.e., indicative of the SQL flavor, is set to remember this—block 406. If the database driver caches the statement ID (identifier) and its associated SQL flavor—determination 408—the statement ID is retained in the cache, the indicator variable, i.e., SQL flavor, is set to remember this—block 410. Otherwise, the database driver might need to signal the application that it must PREPARE the SQL text—block 412.

Next, it is determined—determination 414—whether the database engine mode needs to be changed in order to handle a particular SQL flavor based on the SQL flavor indicator set above. If so, the mode of the database engine is changed—compare 416, 416 A, 416b.

If it may be required to store the cursor ID to SQL flavor association, there is the option to synthesize the cursor ID, encoding the associated SQL flavor of the statement—block 418. Then, the database driver performs a standard function of sending the SQL OPEN or EXECUTE request to the database, the statement ID used during database PREPARE (originally parsed from the application or decoded there from), and optionally also the original cursor ID of the application or the cursor ID synthesized by the driver encoding information about the SQL flavor—compare block 420, 420A, 420B.

If it may be required to store the cursor ID to SQL flavor association, there is the option to cache the cursor ID either from the application or the one returned from the database engine along with the associated SQL flavor of the statement—block 422.

Finally, the database driver returns the result of the database engine OPEN/EXECUTE result and optionally a cursor ID (optionally from the application, one generated by the database engine or, one synthesized by the inventive method) to the application—block 424.

FIG. 5 shows a block diagram 500 of an SQL flavor FETCH/CLOSE processing. The application may continue a program code sequence to read data from the database by initiating an SQL FETCH operation and passing a cursor ID returned during the SQL OPEN operation—compare 502. Or, the application may complete a program code sequence to read data from the database by initiating an SQL CLOSE operation passing a cursor ID returned during an SQL OPEN operation.

If the database driver had encoded the SQL flavor within the cursor ID—determination 504—an indicator variable, i.e., SQL flavor, is set to remember this—block 506. If the database driver caches the cursor ID—determination 508—its SQL flavor and a cursor ID is retained in the cache, and the indicator variable, i.e., SQL flavor, is set to remember this—block 510. Otherwise, the database driver may need to signal an ERROR, stating to the application that the state of the cursor was lost—block 512.

Then it is determined—determination 514—whether the database engine mode needs to be modified, i.e., changed or adapted in order to handle a particular SQL flavor based on the SQL flavor indicator set above. If so, the mode of the database engine has changed—compare 516, 516a, 516b.

Then, the database driver performs its standard function of sending the SQL FETCH or CLOSE request to the database, and the cursor ID used during the database OPEN (originally parsed from the application or decoded there from)—block 518, 518a, 518b.

If the operation, requested by the application, was a CLOSE statement, the database driver would now have the option to remove the cache entry associated with a cursor ID with the SQL flavor—block 520. Then, the data base driver returns the result of the database engine FETCH/CLOSE result to the application—block 522.

FIG. 6 shows a block diagram 600 of an SQL flavor COMMIT processing. The application may complete a database transaction by initiating an SQL COMMIT statement—block 602. If the database engine needs to be switched to an alternative SQL flavor to close specific open cursors, these cursors must be closed explicitly by the database driver under the specific mode required. An implicit CLOSE CURSOR operation cannot be assumed. The processing begins by iterating over all open cursors tracked by the database driver—block 604.

Depending on the specification of the COMMIT statement, if a cursor would be closed by a COMMIT statement—determination 606—and if the cursor ID (via encoded SQL flavor information or by the cursor cache) indicates that the cursor must be closes on a specific database engine mode—determination 608—then, the cursor is closed, as described above, in the context of FIG. 5—block 610. The database driver performs then its standard function of sending the SQL COMMIT request—a statement Corporation—to the database—block 612. Next, the database performs the COMMIT operation and returns with a status code—612, 612a, 612b. Finally, the database driver returns the result of the database engine COMMIT response—block 614.

FIG. 7a, and FIG. 7b show a first part and a second part of an example of the abbreviated grammar of an IBM System i SQL naming mode embodiment. In the example, "TokenText" may be any non-keyword text token identified during lexical parsing.

FIG. 8 shows an example of a parse tree, which may easily be interpreted by a person skilled in the art of database management systems.

It may also be noted that a PREPARE versus EXECUTE flavor control may be determined in the following way:

If the election of the SQL flavor behavior required to emulate a specific behavior that is controlled by his switch when the SQL statement is prepared, then the change of behavior is accomplished during the PREPARE operation.

If the selection of the SQL flavor needs to be switched at EXECUTE, or CURSOR OPEN time, either, firstly, a cache associating the SQL flavor of a particular SQL statement identified by a particular statement ID needs to be populated at PREPARE time or secondly, the SQL flavor of a particular SQL statement needs to be marked by a flag in the statement ID itself—e.g., "StmtID0001_FlavorB" and returned by PREPARE. At EXECUTE time, and CURSOR OPEN time, the invoked SQL-flavor-database-driver may then determine the control sequence necessary based on the SQL statement ID and may change the behavior/the mode of the DBMS.

If the selection of the SQL flavor needs to be switched at FETCH, CLOSE CURSOR or COMMIT time, either, firstly, a cache associating the SQL flavor of a cursor for a particular SQL statement identified by a particular cursor ID needs to be populated at OPEN CURSOR or secondly, the SQL flavor of a particular SQL cursor needs to be marked by a flag in the statement ID itself—e.g., "CursorID0001 FlavorB" and returned by CURSOR OPEN; at FETCH, CLOSE CURSOR, or COMMIT, the invoked SQL-flavor-database-driver may then determine the control sequence necessary based on the SQL cursor ID and may change the behavior/the mode of the DBMS.

FIG. 9 shows a block diagram of a database management system (DBMS) 900 for processing structured query language (SQL) statements of different flavors. The database management system comprises a receiving unit, 902, adapted for receiving SQL statements of different SQL flavors from one source. The one source may, e.g., be one application program which may have been written using different programming frameworks supporting different SQL flavors.

The DBMS 900 also comprises a parser module, 904, adapted for parsing each received SQL statement for identifying an SQL flavor characteristic of the received SQL statements, and a tracking unit 906 adapted for tracking an SQL statement identifier of a related SQL PREPARE operation of the received SQL statements for determining the SQL flavor characteristic at subsequent database management system operations referencing the SQL statement identifier.

The DBMS 900 also comprises a first modifying unit 908 adapted for adapting a database management system mode of the database management system 900 dynamically to the identified SQL flavor characteristic, and a second modifying unit 910 adapted adapting another received SQL statement to a database management system mode of the database management system. Last but not least the DBMS 900 comprises a sending unit 912 adapted for sending each of the adapted SQL statements to the database management system 900 for the SQL PREPARE operation under the adapted database management system mode.

Embodiments of the disclosure may be implemented together with virtually any type of computer, regardless of the platform being suitable for storing and/or executing program code. FIG. 10 shows, as an example, a computing system 1000 suitable for executing program code related to the proposed method.

The computing system 1000 is only one example of a suitable computer system and is not intended to suggest any limitation as to the scope of use or functionality of embodiments of the disclosure described herein. Regardless, computer system 1000 is capable of being implemented and/or performing any of the functionality set forth hereinabove. In the computer system 1000, there are components, which are operational with numerous other general purpose or special purpose computing system environments or configurations. Examples of well-known computing systems, environments, and/or configurations that may be suitable for use with computer system/server 1000 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 1000 may be described in the general context of computer system-executable instructions, such as program modules, being executed by a computer system 1000. Generally, program modules may include routines, programs, objects, components, logic, data structures, and so on that perform particular tasks or implement particular abstract data types. Computer system/server 1000 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 1000 is shown in the form of a general-purpose computing device. The components of computer system/server 1000 may include, but are not limited to, one or more processors or processing units 1002, a system memory 1004, and a bus 1006 that couples various system components including system memory 1004 to the processor 1002. Bus 1006 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 1000 typically includes a variety of computer system readable media. Such media may be any available media that is accessible by computer system/server 1000, and it includes both, volatile and non-volatile media, removable and non-removable media.

The system memory 1004 may include computer system readable media in the form of volatile memory, such as random access memory (RAM) 1008 and/or cache memory 1010. Computer system/server 1000 may further include other removable/non-removable, volatile/non-volatile computer system storage media. By way of example only, storage system 1012 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 1006 by one or more data media interfaces. As will be further depicted and described below, memory 1004 may include at least one program product having a set (e.g., at least one) of program modules that are configured to carry out the functions of embodiments of the disclosure.

Program/utility 1014, having a set (at least one) of program modules 1016, may be stored in memory 1004 by way of example, and not limitation, as well as an operating system, one or more application programs, other program modules, and program data. Each of the operating system, one or more application programs, other program modules, and program data or some combination thereof, may include an implementation of a networking environment. Program modules 1016 generally carry out the functions and/or methodologies of embodiments of the disclosure as described herein.

The computer system/server 1000 may also communicate with one or more external devices 1018 such as a keyboard, a pointing device, a display 1020, etc.; one or more devices that enable a user to interact with computer system/server 1000; and/or any devices (e.g., network card, modem, etc.) that enable computer system/server 1000 to communicate with one or more other computing devices. Such communication can occur via Input/Output (I/O) interfaces 1014.

Still yet, computer system/server 1000 may communicate with one or more networks such as a local area network (LAN), a general wide area network (WAN), and/or a public network (e.g., the Internet) via network adapter 1022. As depicted, network adapter 1022 may communicate with the other components of computer system/server 1000 via bus 1006. It should be understood that although not shown, other hardware and/or software components could be used in conjunction with computer system/server 1000. Examples, include, but are not limited to: microcode, device drivers, redundant processing units, external disk drive arrays, RAID systems, tape drives, and data archival storage systems, etc.

Additionally, the inventive database management system 900 may be attached to the bus system 1006.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:
1. A method comprising:
receiving a first structured query language (SQL) query;
parsing the first SQL query to determine that syntax and semantics of the first SQL query correspond to a first flavor of a plurality of flavors;
setting a database to a first database system management mode of a plurality of database system management modes, with a selection of the first database system management mode being based upon the first database system management mode's ability to handle SQL queries having syntax and semantics according to the first flavor;
responding, by the database and in the first database system management mode, to the first SQL query to obtain first query response(s);
subsequent to the response to the first SQL query, receiving a second SQL query;
parsing the second SQL query to determine that syntax and semantics of the second SQL query correspond to a second flavor of a plurality of flavors;
re-setting the database to a second database system management mode, with a selection of the second database system management mode being based upon the second database system management mode's ability to handle SQL queries having syntax and semantics according to the second flavor, and with the second database system management mode being different than the first database system management mode; and
responding, by the database management system and in the second database system management mode, to the second SQL query to obtain second query response(s).

2. The method of claim 1 wherein responding to the first SQL query includes:
preparing the first SQL query through use of a PREPARE operation to obtain a prepared query.

3. The method of claim 2 wherein the prepared statement is a template statement into which database management system parameters are substituted.

4. The method of claim 1 wherein the database management system is a relational database management system (RDMS).

5. The method of claim 1 wherein responding to the second SQL query includes:
preparing the second SQL query through use of a PREPARE operation to obtain a second prepared query.

6. A computer program product (CPP) comprising:
a machine readable storage device; and
computer code stored on the machine readable storage device, with the computer code including instructions and data for causing a processor(s) set to perform operations including the following:
receiving a first structured query language (SQL) query,
parsing the first SQL query to determine that syntax and semantics of the first SQL query correspond to a first flavor of a plurality of flavors,
setting a database to a first database system management mode of a plurality of database system management modes, with a selection of the first database system management mode being based upon the first database system management mode's ability to handle SQL queries having syntax and semantics according to the first flavor,
responding, by the database and in the first database system management mode, to the first SQL query to obtain first query response(s),
subsequent to the response to the first SQL query, receiving a second SQL query,
parsing the second SQL query to determine that syntax and semantics of the second SQL query correspond to a second flavor of a plurality of flavors,
re-setting the database to a second database system management mode, with a selection of the second database system management mode being based upon the second database system management mode's ability to handle SQL queries having syntax and semantics according to the second flavor, and with the second database system management mode being different than the first database system management mode, and
responding, by the database management system and in the second database system management mode, to the second SQL query to obtain second query response(s).

7. The CPP of claim 6 wherein responding to the first SQL query includes:
preparing the first SQL query through use of a PREPARE operation to obtain a prepared query.

8. The CPP of claim 7 wherein the prepared statement is a template statement into which database management system parameters are substituted.

9. The CPP of claim 6 wherein the database management system is a relational database management system (RDMS).

10. The CPP of claim 6 wherein responding to the second SQL query includes:
preparing the second SQL query through use of a PREPARE operation to obtain a second prepared query.

11. A computer system (CS) comprising:
a processor(s) set;
a machine readable storage device; and
computer code stored on the machine readable storage device, with the computer code including instructions and data for causing the processor(s) set to perform operations including the following:
receiving a first structured query language (SQL) query,
parsing the first SQL query to determine that syntax and semantics of the first SQL query correspond to a first flavor of a plurality of flavors,
setting a database to a first database system management mode of a plurality of database system management modes, with a selection of the first database system management mode being based upon the first database system management mode's ability to handle SQL queries having syntax and semantics according to the first flavor,
responding, by the database and in the first database system management mode, to the first SQL query to obtain first query response(s),
subsequent to the response to the first SQL query, receiving a second SQL query,
parsing the second SQL query to determine that syntax and semantics of the second SQL query correspond to a second flavor of a plurality of flavors,
re-setting the database to a second database system management mode, with a selection of the second database system management mode being based upon the second database system management mode's ability to handle SQL queries having syntax and semantics according to the second flavor, and with the second database system management mode being different than the first database system management mode, and
responding, by the database management system and in the second database system management mode, to the second SQL query to obtain second query response(s).

12. The CS of claim 11 wherein responding to the first SQL query includes:
preparing the first SQL query through use of a PREPARE operation to obtain a prepared query.

13. The CS of claim 12 wherein the prepared statement is a template statement into which database management system parameters are substituted.

14. The CS of claim 11 wherein the database management system is a relational database management system (RDMS).

15. The CS of claim 11 wherein responding to the second SQL query includes:
    preparing the second SQL query through use of a PREPARE operation to obtain a second prepared query.

* * * * *